United States Patent [19]

Johansson et al.

[11] Patent Number: 4,969,635
[45] Date of Patent: Nov. 13, 1990

[54] APPARATUS FOR USE IN TRIMMING CAN BODIES

[75] Inventors: Bert E. Johansson; Ray L. Bowles, both of Golden; Leroy J. Haverland, Westminster, all of Colo.

[73] Assignee: Adolph Coors Company, Golden, Colo.

[21] Appl. No.: 337,359

[22] Filed: Apr. 13, 1989

[51] Int. Cl.$^5$ .............................................. B23Q 3/14
[52] U.S. Cl. .................................. 269/48.1; 269/48.2; 269/48.3; 269/254 R; 269/218; 269/217
[58] Field of Search ...................... 269/48, 48.1, 48.2, 269/48.3, 48.4, 217, 218, 254 R

[56] References Cited

U.S. PATENT DOCUMENTS

| | | | |
|---|---|---|---|
| 2,906,226 | 9/1956 | Myrick et al. | 269/48.1 |
| 3,425,251 | 7/1966 | Maytag . | |
| 3,581,691 | 6/1971 | Ringler . | |
| 3,972,299 | 8/1976 | Hasselbeck et al. . | |
| 4,416,459 | 11/1983 | Morawski et al. | 269/48 |
| 4,783,982 | 11/1988 | Hahn et al. . | |

Primary Examiner—D. S. Meislin
Assistant Examiner—Jack Lavinder
Attorney, Agent, or Firm—Klaas & Law

[57] ABSTRACT

A collapsible mandrel for use in holding a can body in a process wherein a portion of the can body having uneven edges on the open end thereof is trimmed away is provided and comprises a hollow support member having a longitudinal axis and mounted at a relatively fixed location and having a plurality of axially and radially outwardly extending resilient fingers integral therewith and an elongated hollow member mounted on the hollow support member to provide for linear movement therebetween. The elongated hollow member has a bearing surface in contact with the resilient fingers so that movement of the elongated hollow member varies the radially outwardly extent of the resilient fingers so that can bodies having inner peripheral surfaces of differing inner diameters may be readily moved over the resilient fingers but wherein the resilient fingers will exert a sufficient force thereon so that the can body will rotate with the resilient fingers. A movement limiting member is mounted within the resilient fingers so as to limit the radially inward movement of the resilient fingers. A locking device is provided to prevent the rotation of the elongated hollow member.

20 Claims, 2 Drawing Sheets

APPARATUS FOR USE IN TRIMMING CAN BODIES

FIELD OF THE INVENTION

This invention relates generally to processes wherein a portion of the sidewall of a can body having uneven edges on the open end thereof is trimmed away and more specifically to the apparatus for holding the can body on a rotating mandrel for rotation therewith while preventing relative rotational movement between the can body and the holding apparatus during such trimming operation.

BACKGROUND OF THE INVENTION

In the normal operation of a can body manufacturing operation using apparatus such as the type illustrated in U.S. Pat. No. 3,425,251 to Maytag, it is necessary to change the forming sleeve on the front end of the ram at periodic intervals because of wear and tear on the forming sleeve. At each change, the forming sleeve is reground and polished so that the diameter of the forming sleeve is reduced at each change. This of course results in the formation of can bodies having cylindrical sidewalls with smaller inner diameters after each change of the forming sleeve. In one type of operation, it is customary to change the forming sleeve between fifty and sixty times, so that can bodies of fifty to sixty differing diameters are produced. This also has an effect on the apparatus wherein a portion of the can body having uneven edges at the open end thereof is trimmed away. In such apparatus, it is conventional to use a collapsible mandrel wherein a plurality of resilient fingers are integral with a support having a longitudinal axis wherein the resilient fingers extend in axial and radially outward directions from the support. A locking ring is used in conjunction with the support and the resilient fingers to limit the radially outward movement of the resilient fingers while permitting limited radially inward movement of the resilient fingers The resilient fingers are designed to contact the inner peripheral surface of the can body so as to hold the can body for rotation therewith. The nature of the resilient fingers is such that when the diameter of the inner peripheral surface has been changed by several changes of the forming sleeve, it is necessary to change the locking ring because either too much force has to be placed on the can bodies to move the can bodies over the resilient fingers having an outer diameter for can bodies having larger inner diameters or the resilient fingers will not hold the can body firm enough to prevent relative rotation between the can body and the resilient fingers. Thus, as described below, even though the difference in inner diameters of the can bodies and outer diameters of the resilient fingers as controlled by the locking rings is very small, it is necessary to change the locking rings for can bodies of smaller or larger inner diameters for the satisfactory operation of the can body trimming apparatus. In trimming apparatus used with the can body manufacturing apparatus described above, it is customary to have six different locking rings to accommodate the fifty to sixty differing sizes of can bodies. The forming sleeves for the above operation have a maximum diameter of 2.4783 inches and a minimum diameter of 2.4723 inches and the six locking rings have internal cylindrical surfaces for limiting the radially outward movement of the resilient fingers having diameters of 2.007; 2.009; 2.011; 2.013; 2.015 and 2.017 inches. Therefore, after a plurality of changes of the forming sleeves, it is necessary to change the locking ring of the trimming apparatus. In some trimming apparatuses, a plurality of trimming stations are mounted on a rotating turret so that, when can bodies having a different internal diameter are to be processed, it is necessary to change a plurality of locking rings.

BRIEF DESCRIPTION OF THE INVENTION

This invention provides a collapsible mandrel for a trimming apparatus wherein the radially outer diameter of a plurality of resilient fingers of the collapsible mandrel may be varied without removing any portion thereof from the trimming apparatus.

In the preferred embodiment of the invention, there is provided a hollow support member which is adapted to be mounted at a relatively fixed location in the trimming apparatus. The hollow support member has a longitudinal axis and a plurality of integral elongated spaced apart resilient fingers extending in axial and radially outward directions therefrom. The resilient fingers have outer arcuate surfaces comprising a first part shaped generally as a frustum of a cone and a second part shaped generally as a cylinder with the first part being located closer to the hollow support member. An elongated member, having a longitudinal axis coinciding with the longitudinal axis of the hollow support member, is mounted on the hollow support member so as to provide for relative linear movement therebetween in axial directions. The elongated hollow member has a generally cylindrical bearing surface which is in contact with the outer surfaces of the first part of the resilient fingers so as to limit the radially outward movement of the resilient fingers. The relative linear movement between the hollow support member and the elongated hollow member in axial directions functions to vary the radially outer diameter of the resilient fingers so as to accommodate can bodies having cylindrical sidewalls of different inner diameters. The relative linear movement is accomplished by providing an externally threaded portion on the hollow support member and an internally threaded portion on the elongated hollow member in threaded engagement therewith so that rotation of the elongated hollow member results in linear axial movement of the elongated hollow member relative to the hollow support member. The hollow support member and the elongated hollow member are provided with guide means for guiding the internally and externally threaded sections into proper engagement. As a can body is moved over the resilient fingers, it deflects the resilient fingers and moves into a position to establish surface to surface contact between opposite portions of the inner surface of the can body and the second part of the resilient fingers to hold the can body for rotation with the resilient fingers. Locking means are provided for preventing relative rotational movement between the elongated hollow member and the hollow support member. Also, movement limiting means are provided for limiting the radially inward movement of the resilient fingers to protect them from damage from accidental radially inwardly directed forces applied thereto.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
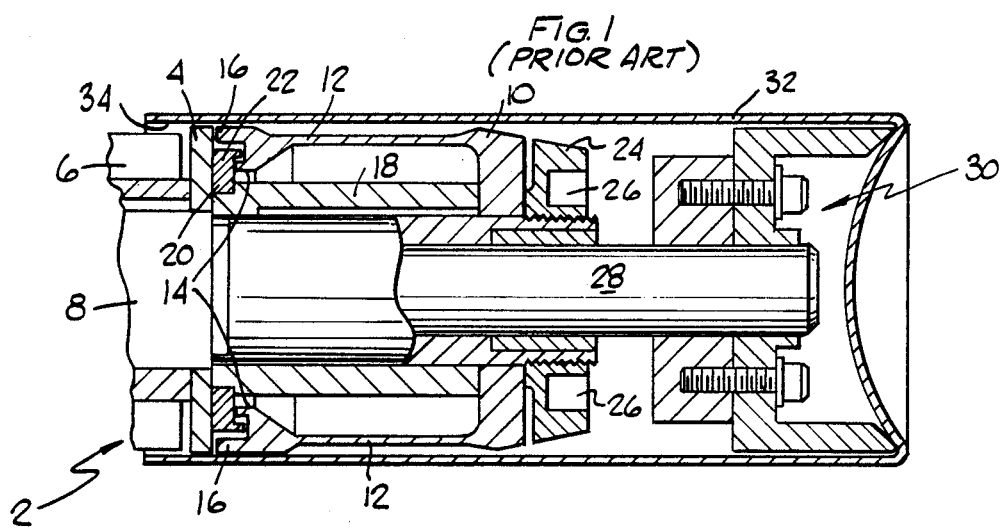
FIG. 1 is a cross-sectional view of a prior art apparatus.

In FIG. 1, there is illustrated a collapsible mandrel 2 of the prior art. A knife 4 and a knurling roller 6 are mounted on a rotatable shaft 8 for rotation therewith. A hollow support member 10 is mounted on the rotatable shaft 8 for rotation therewith and has a plurality of integral elongated spaced apart resilient fingers 12 which extend therefrom in axial and radially outwardly directions. Each resilient finger 12 has a bifurcated section adjacent the free end thereof comprising a radially inward flange 14 and a radially outward flange 16. A hollow spacer 18 is mounted on the rotatable shaft 8. A locking ring 20 is secured on the hollow spacer 18 and has an integral flange projecting therefrom in an axial direction and having a generally cylindrical radially inward surface 22 which is located to be contacted by the radially inward flanges 14 so as to limit the radially outward movement of the resilient fingers 12. A threaded nut 24 having spanner openings 26 is threaded onto the rotatable shaft 8 and when tightened, bears against the hollow support member 10 to urge it, the spacer 18 and locking ring 20 into contact with a shoulder on the shaft 28 and the knife 4 for rotation therewith A shaft 28 is mounted in the rotatable shaft 8 for rotation therewith and for sliding movement relative thereto. Can body locating means 30 are secured to an integral flange on the shaft 28 for locating a can body 32 at the proper position over the knife 4. As the can body 32 is moved over the collapsible mandrel 2 by conventional means (not shown), the inner peripheral surface 34 thereof contacts the outer surfaces of the resilient fingers 12 and moves them in a radially inward direction against the resilient forces thereof. As indicated in FIG. 1, the integral flange of the locking ring 20 is located between the radially inward flange 14 and the radially outward flange 16. The radially outwardly directed force of the resilient fingers 12 is sufficient to hold the can body 30 for rotation therewith without rotational slippage therebetween but are small enough to permit the can body 30 to move over the resilient fingers 12 until it is properly located over the knife 4. As described above, when a new supply of can bodies 30 having an inner peripheral surface of a different diameter are to be processed, it is necessary to change the locking ring 20. To change the locking ring 20, it is necessary to remove the shaft 28 and the can body locating means 30, loosen the threaded nut 24, remove the collapsible mandrel 2, remove the old locking ring 20 and install a new locking ring 20. Thereafter, all of the foregoing parts must be reassembled.

Figure 2:
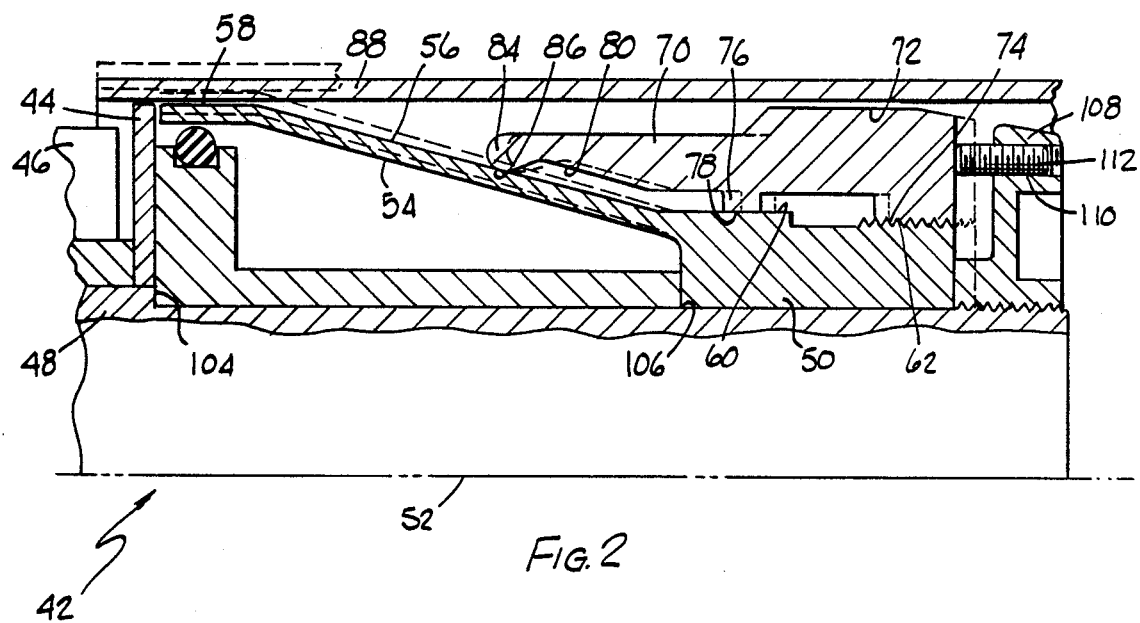
FIG. 2 is a cross-sectional view of a portion of the preferred embodiment of this invention.
Figure 3:
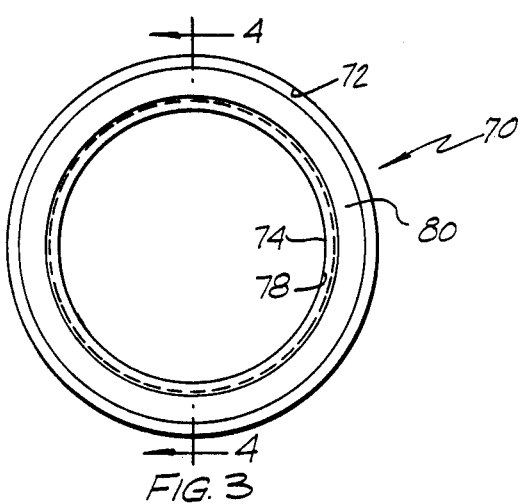
FIG. 3 is a front elevational view of the elongated hollow member.
Figure 4:
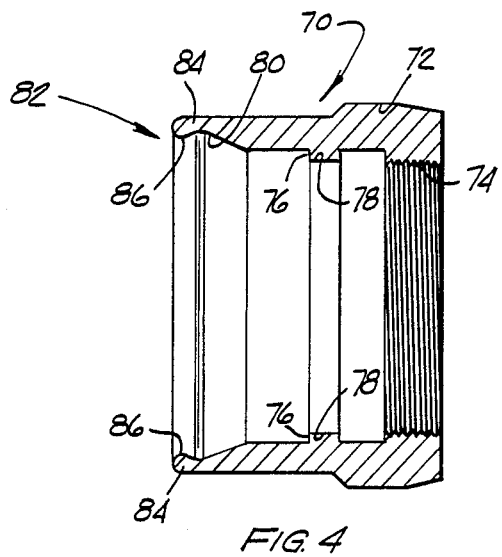
FIG. 4 is a cross-sectional view taken on the line 4—4 of FIG. 3.
Figure 5:
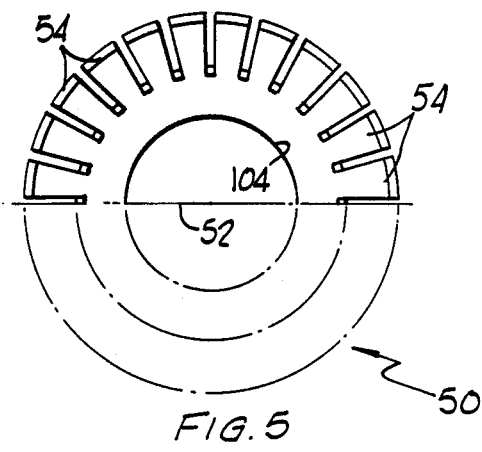
FIG. 5 is a front elevational view of the hollow support members.
Figure 6:
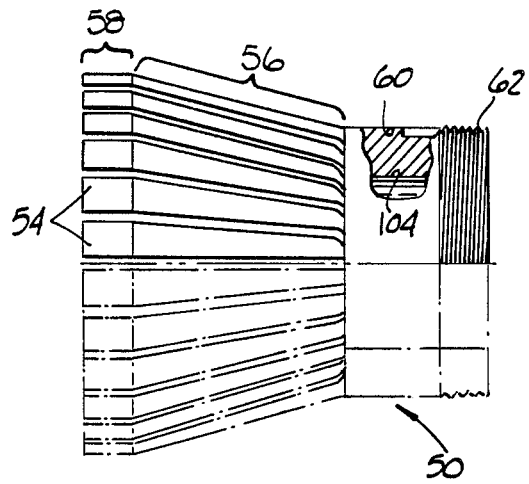
FIG. 6 is a side elevational view with parts in section of FIG. 5.

A collapsible mandrel 42 of this invention is illustrated in FIGS. 2-8. A knife 44 and a knurling roller 46 are mounted on a rotatable shaft 48 for rotation therewith. A hollow support member 50, FIGS. 2, 5 and 6, is mounted on the rotatable shaft 48 at a relatively fixed location for rotation therewith, as described below, and has a longitudinal axis 52 which coincides with the axis of rotation of the rotatable shaft 48. A plurality of integral elongated spaced apart resilient fingers 54 extend therefrom in axial and radially outward directions. The resilient fingers 54 have arcuate outer surfaces and comprise a first part 56 whose outer surfaces are shaped generally as a frustum of a cone and a second part 58 whose outer surfaces are shaped generally as a cylinder. The hollow support member 50 has a generally cylindrical radially outer surface 60 and an externally threaded portion 62. The diameter of the externally threaded portion 62 is equal to or less than the diameter of the generally cylindrical surface 60.

An elongated hollow member 70, having a longitudinal axis coinciding with the longitudinal axis of the hollow support member 50, is illustrated in FIGS. 2-4 and has an outer surface the largest portion thereof comprising a generally cylindrical surface 72 having a diameter slightly smaller than the smallest diameter of the inner peripheral surface of a can body to be moved thereover as described below. The elongated hollow member 70 has an internally threaded portion 74 that is dimensioned to mate with and be engaged with the externally threaded portion 62. A radially inwardly directed projection 76 is formed on the elongated hollow member 70 and has a generally cylindrical inner peripheral surface 78 having a diameter substantially the same as but slightly greater than the diameter of the generally cylindrical outer peripheral surface 60 of the hollow support member 50 for purposes described below. Another portion 80 of the inner peripheral surface of the elongated hollow member 70 has the shape generally of a frustum of a cone with the largest diameter thereof closer to the open end 82. Between the another portion 80 and the open end 82, the elongated hollow member 70 has a knob like portion 84 having a radially inward bearing surface 86 that is round in the radial direction and arcuate in the axial direction.

The hollow support member 50 and the elongated hollow member 70 are assembled by inserting the hollow support member 50 into the elongated hollow member 70. The generally cylindrical outer peripheral surface 60 contacts the generally cylindrical inner surface 78 and guides the movement thereof to ensure that the externally threaded portion 62 contacts the internally threaded portion 74. Rotation of the elongated hollow member 70 secures it onto the hollow support member 50. As illustrated in FIG. 2, when the hollow support member 50 and the elongated hollow member 70 are assembled, the bearing surface 86 contacts the outer surfaces of the first part 56 to limit the radially outward movement of the resilient fingers 54. The resilient fingers 54 are located relative to the externally threaded portion 62, and the bearing surface 86 is located relative to the internally threaded portion 74 so that there will be no contact between the bearing surface 86 and the resilient fingers 54 until at least the internally and externally threaded portions 74 and 62 have formed at least one complete thread. As illustrated by the dotted outline in FIG. 2, as the elongated hollow member 70 is rotated, it moves from a fully closed position linearly in an axial direction from left to right so that the resilient fingers 54 move radially outwardly so as to accommodate can bodies having an inner peripheral surface of a larger diameter. Also, the resilient fingers 54 have sufficient flexibility so that the second parts 58 thereof are in surface to surface contact with portions of the inner peripheral surface of the can body 88. As illustrated in FIG. 2, when the resilient fingers 54 are in their smallest operative position, the cylindrical surface of the second part 58 has a longitudinal axis that coincides with the longitudinal axis of the hollow support member 50. However, if desired, the second part 58 could be a frustum of a cone of a very slight taper with the largest diameter thereof next adjacent to the open end of the resilient fingers 54.

Figure 7:
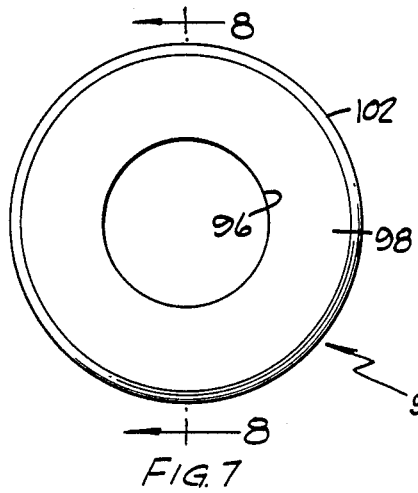
FIG. 7 is a front elevational view of the movement limiting means.
Figure 8:
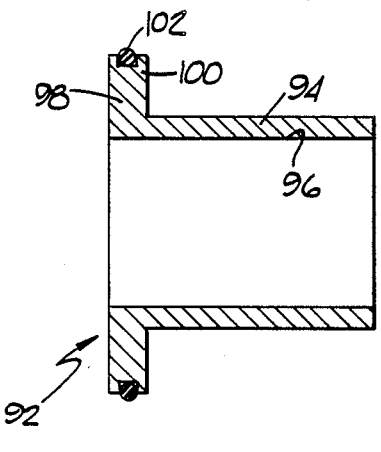
FIG. 8 is a cross-sectional view taken on the line 8—8 of FIG. 7.

In FIGS. 2, 7 and 8, there is illustrated movement limiting means 92 for limiting the radially inward movement of the resilient fingers 54 comprising a body portion 94 having a generally cylindrical inner peripheral surface 96 having a diameter slightly larger than the outer diameter of the shaft 48 so that the body portion 94 may be positioned on the shaft 48. A flange 98 projects radially outwardly from the body portion 94 and has a recess 100 in which is seated a resilient O-ring 102 to cushion any accidental contact of a resilient finger 54 therewith.

The collapsible mandrel 42 is assembled by inserting the hollow support member 50 into the elongated hollow member 70. The cylindrical surfaces 60 and 78 function to guide the externally threaded surface 62 into contact with the internally threaded surface 74. Rotation of the elongated hollow member 70 makes the threaded engagement thereof on the hollow support member 50. The bearing surface 86 forces the resilient fingers 54 radially inwardly. The movement limiting means 92 are positioned on the shaft 48 and moved into contact with a shoulder 104 on the shaft 48. The hollow support member 50 and the elongated hollow member 70 are positioned on the shaft 48 with the generally cylindrical inner peripheral surface 106 of the hollow support member 50 in contact with the outer peripheral surface of the shaft 48. A nut 108 is threaded onto the end of the shaft 48 and is tightened to bear against the hollow support member 50 to force it against the movement limiting means 92 and the flange 98 against the shoulder 104 on the shaft 48 so as to hold the hollow support member 50 and the elongated hollow member 70 o the shaft 48 for rotation therewith. The diameter of the cylindrical surface of the second part 58 of the resilient fingers may be reduced by the rotation of the elongated hollow member 70 in an amount up to about 0.020 of an inch. A can body 88 from a plurality of can bodies to be trimmed is used to test the location of the resilient fingers 54. If the can body 88 cannot be pushed over the resilient fingers 54, it is removed and the elongated hollow member 70 is rotated to move the resilient fingers 54 radially inwardly. The process is repeated until the can body 88 can be readily moved over the resilient fingers 54 but will compress them in a sufficient amount so that the surface to surface contacts between the second parts 58 and the inner peripheral surface of the can body 88 will hold the can body 88 on the resilient fingers 54 for rotation therewith. Locking means are provided to prevent the rotation of the elongated hollow member 70 and comprise a pair of spaced apart threaded opening 110 in the nut 108 extending in an axial direction and a set screw 112 in each of the threaded openings 110 so that, when the set screws 112 are tightened, they bear against the elongated hollow member 70 to prevent rotation thereof.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A collapsible mandrel for use in holding a can body having an open end with uneven edges in an apparatus wherein the portion of the can body having the uneven edges is trimmed away comprising:
    a hollow support member having a longitudinal axis;
    an elongated hollow member having a longitudinal axis;
    mounting means for mounting said hollow support member and said elongated member on a rotatable shaft of a can body trimming apparatus for rotation therewith;
    a plurality of resilient fingers extending axially and radially outwardly from said hollow support member and having portions adapted to be contacted by portions of the inner surface of a can body to move said resilient fingers in a radially inward direction so that said resilient fingers exert a radially outwardly directed force on said portions of said inner surface to hold said can body for rotation therewith;
    bearing means located on an end of said elongated hollow member for contacting an outer peripheral surface of said resilient fingers so as to limit the radially outward extent thereof; and
    adjustable coupling means comprising a male connector located on the hollow support member and a female connector located on the elongated hollow member for joining together said hollow support member and said elongated hollow member so that said longitudinal axes coincide and for permitting relative movement between said hollow support member and said elongated hollow member for controlling the contacting relationship between said bearing means and said resilient fingers so as to control the radially outward extent of said resilient fingers so that a proper amount of force is applied to said portions of said inner surface.

2. The invention as in claim 1 wherein:
    said hollow support member is in a relatively fixed position on said rotatable shaft.

3. The invention as in claim 1 wherein:
    said relative movement between said hollow support member and said elongated hollow member for controlling the contacting relationship between said bearing means and said resilient fingers is in linear directions.

4. The invention as in claim 3 wherein said adjustable coupling means comprises:
    an externally threaded portion on said hollow support member; and
    an internally threaded portion on said elongated hollow member in threaded engagement with said externally threaded portion so that rotation of said elongated hollow member causes linear movement thereof relative to said hollow support member.

5. The invention as in claim 4 and further comprising:

said elongated hollow member having a generally cylindrical inner surface in addition to said internally threaded portion;

said hollow support member having a generally cylindrical outer surface in addition to said externally threaded portion; and the diameter said generally cylindrical outer surface of said hollow support member being only slightly smaller than the diameter of said generally cylindrical inner surface of said elongated hollow member so as to guide said internally and externally threaded portions into proper contacting relationship as they are moved toward each other.

6. The invention as in claim 4 wherein:

said resilient fingers having arcuate outer surfaces having a first part shaped generally as a frustum of a cone and a second part shaped generally as a cylinder and said second part adapted to contact said portions of the inner peripheral surface of said can body.

7. The invention as in claim 6 wherein:

said outer surfaces of said resilient fingers being radiused at the juncture of said conical and cylindrical shapes to facilitate movement of said can body onto said second part.

8. The invention as in claim 7 wherein:

said second part being sufficiently flexible so as to have surface to surface contact with said portions of the inner peripheral surface of said can body.

9. The invention as in claim 8 wherein:

said elongated hollow member having a generally cylindrical outer peripheral surface having a diameter slightly less than the smallest inner diameter of a can body to be moved thereover.

10. The invention as in claim 6 wherein:

the diameter of said second part may be reduced in an amount of about 0.020 of an inch by said rotation of said elongated hollow member.

11. The invention as in claim 10 and further comprising:

movement limiting means for limiting the radially inward movement of said resilient fingers.

12. The invention as in claim 4 wherein:

said hollow support member is in a relatively fixed axial position on said rotatable shaft.

13. The invention as in claim 12 wherein:

said resilient fingers having arcuate outer surfaces having a first part shaped generally as a frustum of a cone and a second part shaped generally as a cylinder and said second part adapted to contact said portions of the inner surface of said can body.

14. The invention as in claim 13 wherein:

said outer surfaces of said resilient fingers being radiused at the juncture of said conical and cylindrical shapes to facilitate movement of said can body onto said second part.

15. The invention as in claim 14 wherein:

said second part being sufficiently flexible so as to have surface to surface contact with said portions of the inner peripheral surface of said can body.

16. The invention as in claim 15 wherein:

said elongated hollow member having a generally cylindrical outer peripheral surface having a diameter slightly less than the smallest diameter of a can body to be moved thereover.

17. The invention as in claim 16 wherein:

the diameter of said second part may be reduced in an amount of about 0.020 of an inch by rotation of said elongated hollow member.

18. The invention as in claim 17 and further comprising:

said elongated hollow member having a generally cylindrical inner surface in addition to said internally threaded portion;

said hollow support member having a generally cylindrical outer surface in addition to said externally threaded portion; and the diameter said generally cylindrical outer surface of said hollow support member being only slightly smaller than the diameter of said generally cylindrical inner surface of said elongated hollow member so as to guide said internally and externally threaded portions into proper contacting relationship as they are moved toward each other.

19. The invention as in claim 4 and further comprising:

locking means for preventing said rotation of said elongated hollow member.

20. The invention as in claim 19 and further comprising:

said elongated hollow member having a generally cylindrical inner surface in addition to said internally threaded portion;

said hollow support member having a generally cylindrical outer surface in addition to said externally threaded portion; and the diameter said generally cylindrical outer surface of said hollow support member being only slightly smaller than the diameter of said generally cylindrical inner surface of said elongated hollow member so as to guide said internally and externally threaded portions into proper contacting relationship as they are moved toward each other.

* * * * *